United States Patent [19]
Eberhard

[11] Patent Number: 5,437,360
[45] Date of Patent: Aug. 1, 1995

[54] CONVEYING SYSTEM FOR STACKED ARTICLES

[76] Inventor: Hans J. Eberhard, Lupinenstrasse 14, D-76287 Rheinstetten, Germany

[21] Appl. No.: 224,836

[22] Filed: Apr. 7, 1994

[30] Foreign Application Priority Data

Apr. 7, 1993 [DE] Germany ............... 43 11 519.5

[51] Int. Cl.⁶ ............................................. R65G 47/26
[52] U.S. Cl. ................................. 198/460.2; 198/809
[58] Field of Search ............... 198/460, 461, 457, 809

[56] References Cited

U.S. PATENT DOCUMENTS

| | | | |
|---|---|---|---|
| 2,895,593 | 7/1959 | McKnight et al. | 198/809 |
| 2,932,380 | 4/1960 | Alvey, Jr. et al. | 198/809 |
| 3,000,490 | 9/1961 | Sebastian | 198/809 X |
| 3,650,376 | 3/1972 | Burgis et al. | 198/809 X |
| 3,930,573 | 1/1976 | Wyman | 198/809 |
| 3,955,665 | 5/1976 | Pettis, Jr. et al. | 198/809 X |
| 4,149,626 | 4/1979 | Holt | 198/809 X |
| 4,511,030 | 4/1985 | Lem | 198/460 X |
| 4,887,937 | 12/1989 | Thunnissen | 198/809 X |
| 5,004,094 | 4/1991 | Brandt | 198/460 |
| 5,085,311 | 2/1992 | Garro | 198/460 |
| 5,092,451 | 3/1992 | Jones et al. | 198/460 |

FOREIGN PATENT DOCUMENTS

| | | | |
|---|---|---|---|
| 2727638 | 12/1978 | Germany | 198/809 |
| 3134372 | 6/1983 | Germany | 198/809 |
| 0145018 | 7/1986 | Japan | 198/809 |

*Primary Examiner*—D. Glenn Dayoan
*Attorney, Agent, or Firm*—Herbert Dubno; Andrew Wilford

[57] ABSTRACT

A system for conveying stacks of objects has a pair of elongated arrays of idler rollers extending longitudinally parallel next to each other, defining a central longitudinally extending and upwardly open gap, defining a generally horizontal support plane extending longitudinally through a plurality of stations so that the stacks of objects can be supported on the rollers in the stations, and each formed by a plurality of rollers rotatable about parallel axes extending perpendicular to the gap. A flexible conveyor belt has a reach extending longitudinally along the gap between the arrays of rollers and a guide engaging the reach normally holds the reach below the plane. Respective actuators at the stations engage underneath the reach at the respective stations and raise the reach only at the respective stations through the gap and above the plane. A drive connected to the belt generally continuously advances the reach in a downstream longitudinal direction so that when the actuator of one of the stations lifts the belt at the one station any stack in the one station will be engaged by the belt and displaced downstream.

13 Claims, 1 Drawing Sheet

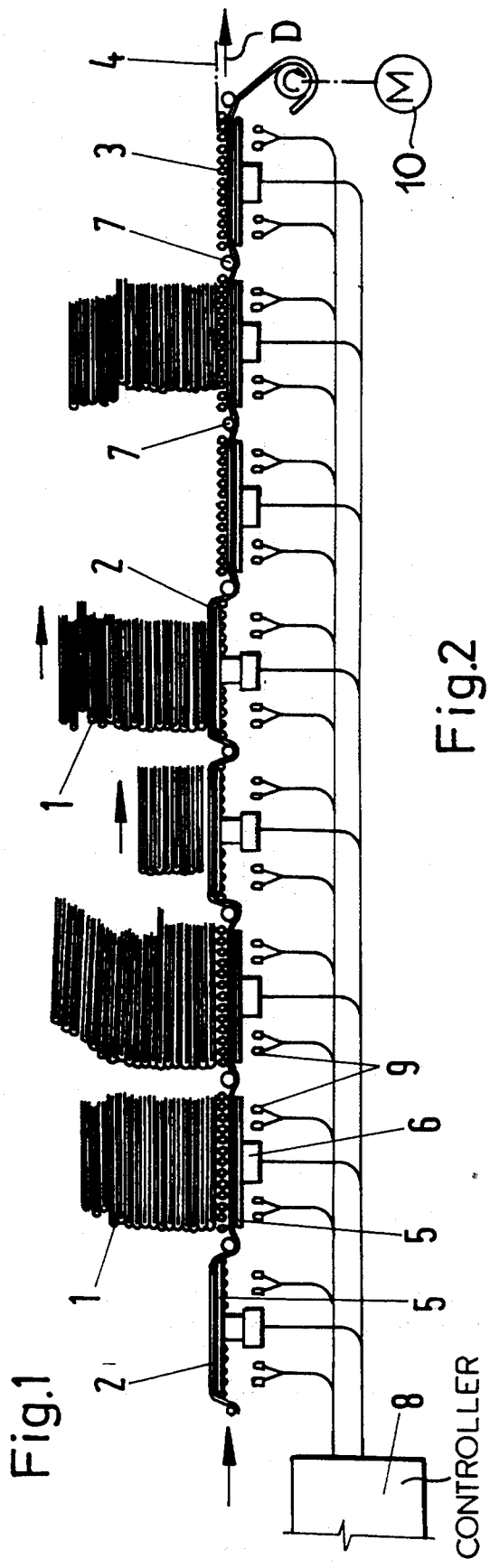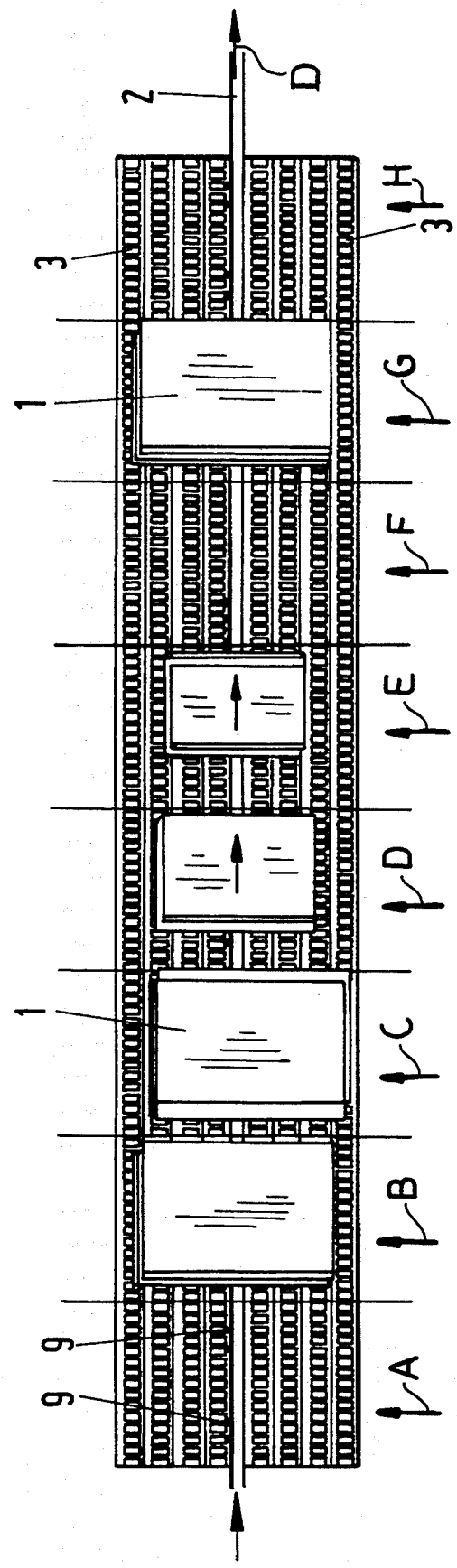

CONVEYING SYSTEM FOR STACKED ARTICLES

FIELD OF THE INVENTION

The present invention relates to a conveying system. More particularly this invention concerns a conveying system for stacked articles, for instance catalogs or publications.

BACKGROUND OF THE INVENTION

Transporting stacks of objects, such as orders being assembled in a mail-order operation, presents a particular problem. The stack must be moved very gently from station to station to avoid upsetting it. Furthermore the stack can vary widely in length and overall size, so accurately positioning it and determining its position can be fairly difficult. In particular in the shipping industry where it is necessary to move orders along a belt past various stations where they are filled, the articles added to each pile can be of various sizes.

Pallets or containers make handling the piles easy, but have several drawbacks. First of all they have to be bigger than even the biggest article being moved, so that they usually take up much more space than they normally need. Furthermore they must be recycled back upstream, requiring that a separate conveyor or some other means be provided for doing this. Finally they add to the weight of the items being produced, so the conveyor must be built move this extra mass which is not really part of the product.

Most conveyor systems are too rough for reliable handling of stacks of articles. Gravity-type skate-roller conveyors, for instance, can be counted on to dump a pile of articles as it comes to a rapid halt against an abutment. Normal stop-and-go conveyors, whether of the belt or walking-beam type, subject the stacks to excessive acceleration and deceleration and therefore can also be counted on to upset any stacks being transported.

OBJECTS OF THE INVENTION

It is therefore an object of the present invention to provide an improved conveyor system for stacks of articles.

Another object is the provision of such an improved conveyor system for stacks of articles which overcomes the above-given disadvantages, that is which conveys stacks of objects without upsetting them and which does not need special pallets or containers to hold the stacked objects.

SUMMARY OF THE INVENTION

A system for conveying stacks of objects has according to the invention a pair of elongated arrays of idler rollers extending longitudinally parallel next to each other, defining a central longitudinally extending and upwardly open gap, defining a generally horizontal support plane extending longitudinally through a plurality of stations so that the stacks of objects can be supported on the rollers in the stations, and each formed by a plurality of rollers rotatable about parallel axes extending perpendicular to the gap. A flexible conveyor belt has a reach extending longitudinally along the gap between the arrays of rollers and a guide engaging the reach normally holds the reach below the plane. Respective actuators at the stations engage underneath the reach at the respective stations and raise the reach only at the respective stations through the gap and above the plane. A drive connected to the belt generally continuously advances the reach in a downstream longitudinal direction so that when the actuator of one of the stations lifts the belt at the one station any stack in the one station will be engaged by the belt and displaced downstream.

Thus the stacks basically sit continuously on the roller conveyors and are moved when the belt section underneath them is raised. As the belt comes slowly into contact with the bottom of the stack, it starts to frictionally entrain it to accelerate it gently and move it downstream. The stack is stopped simply by lowering the belt so that the moving stack is no longer being pushed and coasts to a stop on the roller conveyor. Even an unstable stack can be counted on to stay together with such gentle treatment.

According to the invention each station has a longitudinal length that is smaller than a longitudinal length of a longitudinally longest one of the stacks. This ensures that the stacked objects have sufficient room while only a small amount of collecting space is needed.

Each actuator in accordance with this invention includes a longitudinally extending rail in the respective station directly underneath the belt and means for raising and lowering the rail. The means for lifting can be a pneumatically inflatable bladder.

The guide of this invention includes respective transverse deflecting rollers immediately upstream and immediately downstream of each station and engaging downward against the belt below the plane. The belt is a toothed belt. In addition each array of idler rollers comprises a plurality of longitudinally and transversely spaced rollers.

For accurate process control the system according to the invention has respective sensors in the stations that generate outputs indicating the presence of a one of the stacks in the respective station, and a controller connected to the sensors and actuators for operating the actuators to move detected stacks in accordance with a program. The sensors work without contacting the stacks and can be phototransistors. By making them redundant, with each sensor having two such phototransistors connected in parallel, blocking of one of them will not bring the system down. The sensors are spaced longitudinally apart by a distance smaller than a longitudinal length of a longitudinally shortest one of the stacks. Such a controller can determine the position and longitudinal length of each stack in the system by sampling the sensor outputs. If a stack spills, so that suddenly it becomes longer, this can also be detected and an alarm issued. Its program can be hard-wired or in software or SPS. The sensors can also use capacitance or sound to determine the presence of a stack. In addition since the conveyor moves at a constant speed, a single sensor output can easily be used to determine the length of a stack.

BRIEF DESCRIPTION OF THE DRAWING

The above and other objects, features, and advantages will become more readily apparent from the following description, reference being made to the accompanying drawing in which:

FIG. 1 is a partly diagrammatic, small-scale side view of the system of this invention; and FIG. 2 is a top view of the conveyor system.

SPECIFIC DESCRIPTION

As seen in FIGS. 1 and 2 a plurality of stacks 1 of differently sized objects, here periodicals or books, are moved in a normal travel direction D through a sequence of order-filling stations A through H on a pair of side-by-side conveyors 3 each formed by four long rows of rollers. In a gap between the roller conveyors 3 is the upper reach of a flexible toothed belt 2 that is continuously advanced in the direction D by a reversible drive motor 10. Guide rollers 7 between the stations hold the belt 2 below a horizontal transport plane 4 defined by the conveyors 3.

A bar 5 is positioned at each station A—H underneath the belt 2 and is raisable by a respective air-bladder actuator 6 to a position in which it raises the level of the upper surface of the belt 2 slightly above the plane 4. Thus under normal circumstances the belt 2 lies below the plane 4 and out of contact with the respective stack 1, but when raised this belt 2 touches the stack 1 and displaces it downstream in the direction D. The actuators 6 lift very slowly so that the belt 2 is brought gently into frictional engagement with the lowermost element of the respective stack 1 to bring it up to transport speed smoothly. If the moving stack 1 is to stop in a station, for instance the station F, the respective actuator 6 is depressurized so that it will coast to a gentle halt atop the conveyors 3.

A programmable controller 8 is connected to two photoelectric sensors 9 at each of the stations. Each sensor 9 is formed by two parallel-connected phototransistors so that if one becomes dirty or otherwise nonoperational the other will still work. The sensors 9 detect light coming either from natural sources or from specific lights down between the rollers of the conveyors 3 and can therefore detect if a stack 1 is above them.

The sensors 9 are set at a spacing which is smaller than the longitudinal dimension of the shortest possible stack 1 so that any stack can be detected by them. Thus the controller 8 can determine exactly where every stack is and even know its length. Furthermore if a stack spills and becomes too long or abuts another, this also can be detected and an alarm issued.

I claim:

1. A system for conveying stacks of objects, the system comprising:
   a pair of elongated arrays of idler rollers
      extending longitudinally parallel next to each other,
      defining a central longitudinally extending and upwardly open gap,
      defining a generally horizontal support plane extending longitudinally through a plurality of stations, whereby the stacks of objects can be supported on the rollers in the stations, and
      each formed by a plurality of rollers rotatable about parallel axes extending perpendicular to the gap;
   a flexible conveyor belt having a reach extending longitudinally along the gap between the arrays of rollers;
   guide means engaging the reach and normally holding the reach below the plane;
   means including respective actuators at the stations engageable underneath the reach at the respective stations and operable to raise the reach only at the respective stations through the gap and above the plane; and
   reversible drive means connected to the belt for generally continuously advancing the reach in longitudinal directions, whereby when the actuator of one of the stations lifts the belt at the one station any stack in the one station will be engaged by the belt and displaced longitudinally.

2. The conveyor system defined in claim 1 wherein each station has a longitudinal length that is smaller than a longitudinal length of a longitudinally longest one of the stacks.

3. The conveyor system defined in claim 1 wherein each actuator includes a longitudinally extending rail in the respective station directly underneath the belt and means for raising and lowering the rail.

4. The conveyor system defined in claim 3 wherein the means for lifting is a pneumatically inflatable bladder.

5. The conveyor system defined in claim 1 wherein the guide means includes respective transverse deflecting rollers immediately upstream and immediately downstream of each station and engaging downward against the belt below the plane.

6. The conveyor system defined in claim 1 wherein the belt is a toothed belt.

7. The conveyor system defined in claim 1 wherein each array of idler rollers comprises a plurality of longitudinally and transversely spaced rollers.

8. The conveyor system defined in claim 1, further comprising:
   means including respective sensors in the stations for generating outputs indicating the presence of a one of the stacks in the respective station; and
   ,control means connected to the sensors and actuators for operating the actuators to move detected stacks in accordance with a program.

9. The conveyor system defined in claim 8 wherein the sensors work without contacting the stacks.

10. The conveyor system defined in claim 9 wherein the sensors include phototransistors.

11. The conveyor system defined in claim 10 wherein each sensor includes two such phototransistors connected in parallel.

12. A system for conveying stacks of objects, the system comprising:
   a pair of elongated arrays of idler rollers
      extending longitudinally parallel next to each other,
      defining a central longitudinally extending and upwardly open gap,
      defining a generally horizontal support plane extending longitudinally through a plurality of stations, whereby the stacks of objects can be supported on the rollers in the stations, and
      each formed by a plurality of rollers rotatable about parallel axes extending perpendicular to the gap;
   a flexible conveyor belt having a reach extending longitudinally along the gap between the arrays of rollers;
   guide means engaging the reach and normally holding the reach below the plane;
   means including respective actuators at the stations engageable underneath the reach at the respective stations and operable to raise the reach only at the respective stations through the gap and above the plane;
   drive means connected to the belt for generally continuously advancing the reach in a downstream longitudinal direction, whereby when the actuator of one of the stations lifts the belt at the one station any stack in the one station will be engaged by the belt and displaced downstream;

means including respective sensors in the stations for generating outputs indicating the presence of a one of the stacks in the respective station, the sensors being spaced longitudinally apart by a distance smaller than a longitudinal length of a longitudinally shortest one of the stacks; and control means connected to the sensors and actuators for operating the actuators to move detected stacks in accordance with a program.

13. The conveyor system defined in claim 12 wherein the drive means is reversible.

* * * * *